Patented Aug. 7, 1945

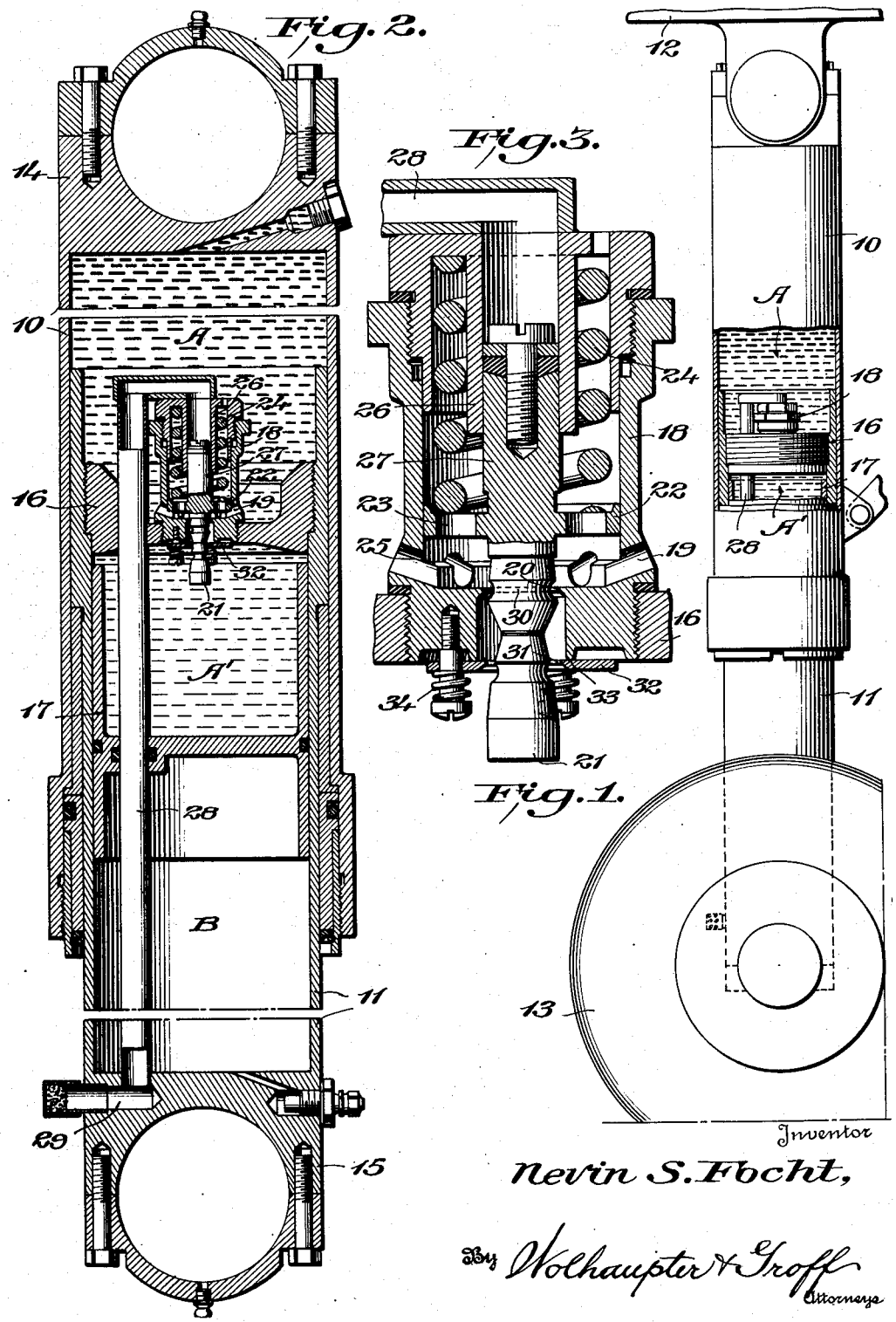

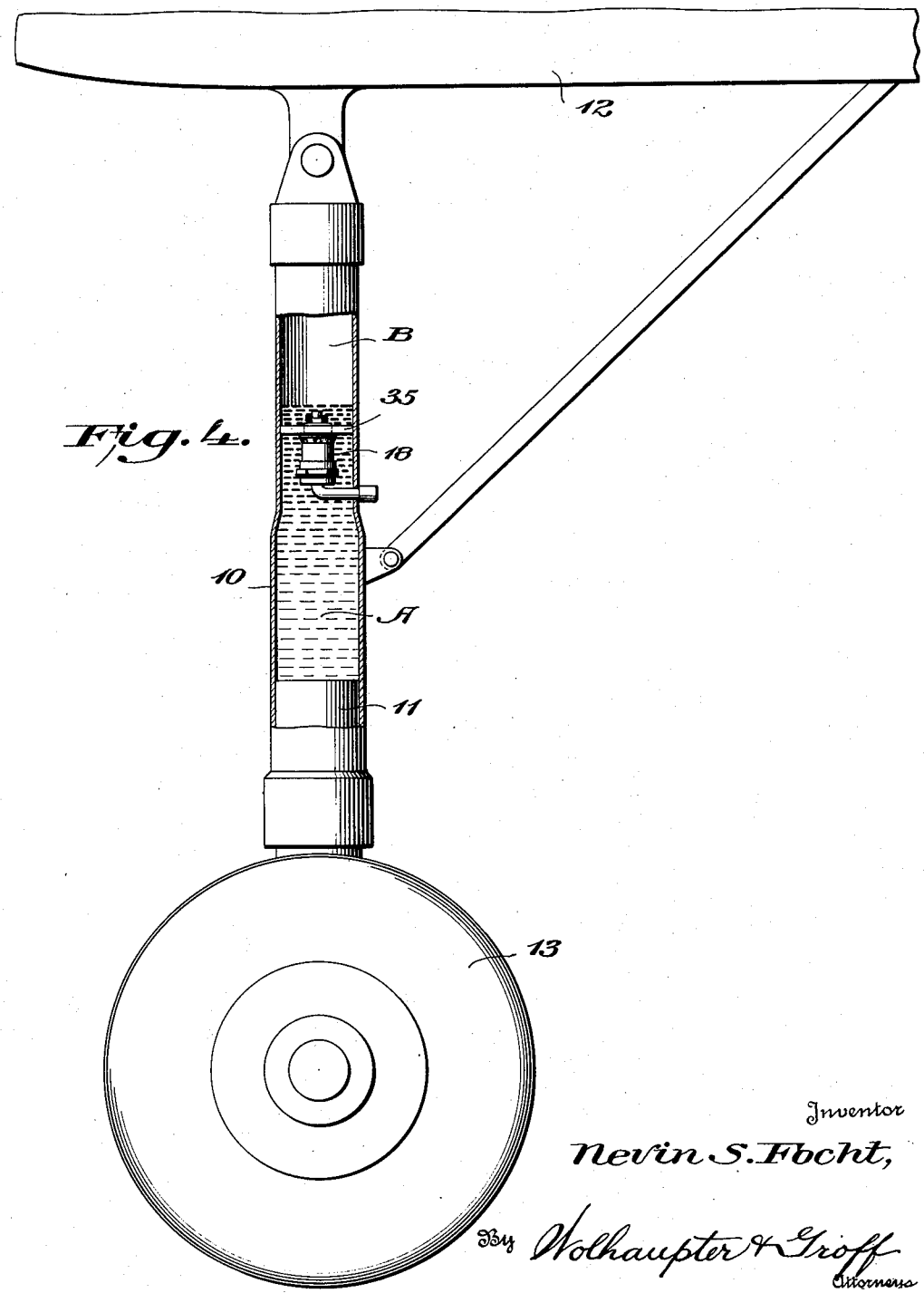

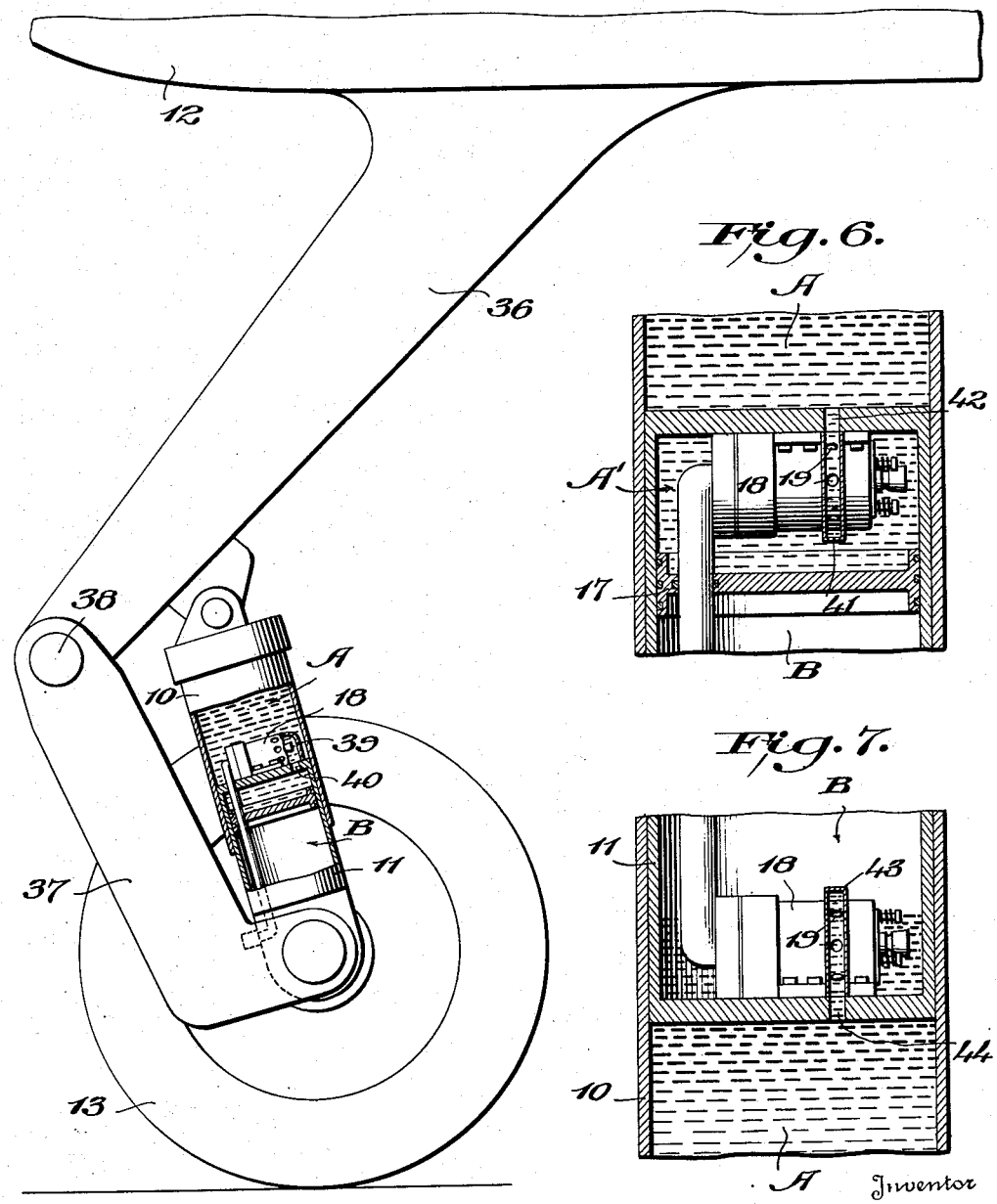

2,381,532

UNITED STATES PATENT OFFICE 2,381,532

SHOCK ABSORBER

Nevin S. Focht, Syracuse, N. Y.

Application March 27, 1943, Serial No. 480,819

5 Claims. (Cl. 267—64)

This invention relates to shock absorbers, particularly for use on aircraft, although capable of other uses, and has for one of its special and more important objects to provide a simple, practical shock absorber which when unloaded, is operable effectively and efficiently to cushion severe shocks imposed thereon, such, for example, as the shocks resulting from impact of an aircraft with the ground during landing of the aircraft, and which, when loaded, as for example when the weight of an aircraft is imposed thereon, is operable equally effectively and efficiently to absorb other severe shocks imposed thereon such, for example, as the shocks resulting from the aircraft encountering elevations and depressions in a field over which it may be taxiing during either landing or take-off thereof.

Another special and important object of the invention is to provide a shock absorber which not only is operable effectively and efficiently to cushion or absorb impact shocks imposed thereon, but which also is operable effectively and efficiently to control the recoil which results from imposition of impact shocks thereon.

Another special and important object of the invention is to provide a shock absorber which, while highly efficient in absorbing all impact shocks imposed thereon, and in controlling resulting recoil, affords a soft, flexible taxiing condition for an airplane on which it is used.

With the foregoing and various other objects in view, which will become more fully apparent as the nature of the invention is better understood, the same consists in a shock absorber embodying the novel features of construction, combination and arrangement of parts as will be hereinafter more fully described, illustrated in the accompanying drawings and defined in the appended claims.

In the accompanying drawings, wherein like characters of reference denote corresponding parts in the different views—

Figure 1 is a side elevation, partly in section, of a shock absorber constructed in accordance with one practical embodiment of the invention and employed as a strut of a strut-type airplane landing gear.

Figure 2 is a central, longitudinal section on an enlarged scale through the shock absorber shown in Fig. 1.

Figure 3 is an enlarged sectional view of the means shown in Fig. 2 for effecting adjustment of the metering pin of the shock absorber.

Figure 4 is a view similar to Fig. 1 illustrating an alternative embodiment of the invention.

Figure 5 is a view similar to Fig. 1 illustrating another alternative embodiment of the invention; and Figures 6 and 7 are detail sectional views illustrating other alternative embodiments of the invention.

Referring to the drawings in detail, first with particular reference to the embodiment of the invention illustrated in Figs. 1 to 3, it will be observed that the present shock absorber is of the cylinder and piston type and comprises, primarily, a cylinder, designated as 10, and a hollow piston slidable therein and designated as 11. It will further be observed that according to the particular example of the invention illustrated in said figures, the shock absorber is disposed vertically and serves as a strut between the fuselage 12 of an aircraft and a landing wheel 13 thereof, the cylinder 10 being disposed uppermost and being closed at its upper end by a head 14 and being connected through the instrumentality of which it is connected to the fuselage 12, and the piston 11 being disposed lowermost and being closed at its lower end by a head 15 by which is carried the landing wheel 13.

At or near its upper or inner end the hollow piston 11 is closed by a head 16, while within said piston, between the heads 15 and 16 thereof, is slidably mounted a floating piston 17.

The space within the cylinder 10, between the head 14 thereof and the piston head 16, constitutes a liquid chamber, designated as A. On the other hand, the space within the piston 11, between the heads 15 and 16 thereof, constitutes a combined liquid-receiving and compressed-air-containing chamber which is divided by the floating piston 17 into a liquid-receiving chamber A' and a compressed-air-containing chamber B.

The chambers A, A' are filled with liquid and the air in the chamber B is under a suitable pressure above atmospheric pressure even when the cylinder 10 and the piston 11 are fully distended relative to each other.

Carried by the piston head 16 is a valve casing 18 which, in the specific example of the invention illustrated in Figs. 1 to 3, is disposed vertically and extends upwardly from said piston head 16 into the liquid chamber A. In this valve casing 18 are openings 19 which afford constant communication between the interior of said casing and the liquid chamber A. Also in said casing 18 is an orifice 20 which affords communication between the interior of said casing and the liquid chamber A' under the control of a metering pin 21.

The metering pin 21 extends downwardly through the orifice 20 from a disk 22 by which it is carried, and in accordance with the invention said disk 22 is fitted in the valve casing 18 for vertical sliding movement whereby said metering pin is mounted for vertical movement relative to the orifice 20 and is guided in such movement. In the disk 22 are openings 23 which provide communication through said disk between the casing spaces above and below said disk.

Between the disk 22 and the top wall of the valve casing 18 is an expansion coil spring 24 which tends constantly to urge said disk and the metering pin 21 to their lowermost positions as determined by engagement of said disk with an upwardly facing shoulder 25 adjacent to the bottom of said casing 18.

Carried by the top wall of the casing 18 and depending therefrom into said casing is a cylinder 26, while carried by the disk 22 and projecting upwardly therefrom into and neatly fitting the cylinder 26 is a plunger 27.

At its upper end the cylinder 26 is in communication with the atmosphere as, for example, through a tube 28 which extends from the upper end of said cylinder downwardly through the piston head 16 and the floating piston 17 to an atmospherically opening duct 29 in the piston head 15.

Liquid in the upper part of the casing 18 always is under the same pressure as prevails in the liquid chamber A and acts downwardly upon the entire portion of the disk 22 which is disposed outwardly of the plunger 27. Likewise, liquid in the lower part of the casing 18, outwardly of an upward prolongation of the orifice 20, always is under the same pressure as prevails in the liquid chamber A and acts upwardly upon that portion of the disk 22 which is disposed outwardly of an upward prolongation of the orifice 20. The orifice 20 and the plunger 27 have equal cross sectional areas. Therefore, as long as the orifice 20 is not choked with liquid, equal top and bottom areas of the disk 22 are subjected to the same pressure as prevails in the chamber A and this pressure has no effect to move the unit comprising the disk 22, the metering pin 21 and the plunger 27 either upwardly or downwardly. On the contrary, said unit is urged downwardly only by the spring 24 and by atmospheric pressure upon the top of the plunger 27, and is urged upwardly only by the pressure of the liquid in the chamber A acting against the lower end of the metering pin 21 and against the under face of the disk 22 within limits defined by an upward prolongation of the orifice 20.

Since the bottom of the chamber A' is comprised by the floating piston 17 resting upon the body of compressed air in the chamber B, the pressure of the liquid in said chamber A' always is the same as the pressure of the air in said chamber B.

When the shock absorber is fully distended the pressure of the air in the chamber B is, of course, at a minimum and of any desired value depending upon the service the shock absorber is designed to perform.

The spring 24 is of a strength such that its pressure exerted downwardly upon the disk 22, combined with the atmospheric pressure exerted downwardly upon the top of the plunger 27, is appropriately greater than the pressure exerted upwardly upon said disk and the metering pin 21 by the liquid in the chamber A' when the shock absorber is fully distended and the pressure of the air in said chamber B and of the liquid in the chamber A' are at a minimum. Therefore, when the shock absorber is fully distended and the pressure of the air in the chamber B and of the liquid in the chamber A' are at a minimum, the metering pin 21 occupies its lowermost position as shown in Fig. 2.

As the shock absorber is subjected to load with consequent inward movement of the cylinder 10 and the piston 11 relative to each other, liquid is forced from the chamber A through the orifice 20 into the chamber A' and the floating piston 17 therefore is forced downwardly relative to the piston 11, with the result that the pressure of the air in the chamber B is increased. For each increment of inward movement of the cylinder and piston relative to each other there will, of course, be a certain definite increase in the pressure of the air in the chamber B and of the liquid in the chamber A' and in this connection the strength of the spring 24 is such that its pressure, combined with the atmospheric pressure tending to urge the metering pin 21 downwardly, is overcome by the pressure of the liquid in the chamber A' tending to urge said metering pin upwardly as the pressure of the liquid in said chamber A' rises. Accordingly, as the shock absorber is subjected to load, the metering pin 21 rises and assumes a certain definite position for each different stroke position of the shock absorber and for the corresponding pressure of the air in the chamber B and of the liquid in the chamber A'.

The upper portion of the metering pin 21 is of such different diameters at different points along its length that for each different position thereof as determined by the corresponding stroke position of the shock absorber and the corresponding pressure of the liquid in the chamber A' it affords an effective area of the orifice 20 such as is calculated to permit just the right amount of liquid to flow from the chamber A into the chamber A' to properly check inward movement of the cylinder 10 and the piston relative to each other consistent with the load imposed upon the shock absorber and the energy to be dissipated.

Assuming that the shock absorber is used upon an airplane and that the airplane is making a normal landing, it is apparent that as the weight of the airplane progressively is imposed upon the shock absorber, the cylinder 10 and the piston 11 will be moved inwardly relative to each other and will be checked in their inward movement by metered flow of liquid from the chamber A into the chamber A' until the entire weight of the airplane is imposed upon the shock absorber and the pressure of the air in the chamber B has risen to balance the weight of the airplane. The cylinder 10 and the piston 11 then will have a certain definite position relative to each other and the metering pin 21 likewise will have a certain definite position relative to the orifice 20 as determined by the position of said cylinder and piston relative to each other and the corresponding pressure of the liquid in the chamber A'. In said position of the metering pin the portion thereof which is in the plane of the orifice 20 is of a relatively small cross sectional area, as indicated at 30, to permit free flow of liquid through said orifice during taxiing of the airplane. Thus, during taxiing of the airplane, its weight will be yieldably sustained by the body of compressed air in the chamber B and as long as the wheel 13 does not encounter any sudden elevation or depression in the surface over which it is travelling, the pressure of the liquid in the chambers A and A' will not be materially changed, the position of the metering pin 21 will not be materially altered and the airplane therefore will have a soft, flexible taxiing condition due to the portion 30 of the metering pin providing for free flow of liquid between the chambers A and A'.

If, during taxiing of the airplane, the wheel 13 should encounter an obstruction or sudden elevation in the surface over which it is travelling, an increased load will be imposed upon the shock absorber with consequent inward movement of the cylinder 10 and the piston 11 relative to each other and increase in the pressure of the liquid in the chamber A'. The metering pin 21 thereupon will rise with consequent constriction of the effective area of the orifice 20 proportionately to the severity of the shock and the amount of increase in pressure of the liquid and inward movement of the cylinder 10 and the piston 11 relative to each other will be smoothly checked.

If, on the other hand, the wheel 13 should encounter a depression in the surface over which it is travelling, the load on the shock absorber will decrease with consequent outward movement of the cylinder 10 and the piston 11 relative to each other, decrease in the pressure of the liquid in the chamber A and return flow of liquid from the chamber A' into the chamber A until a condition of equilibrium again is established.

Return flow of liquid from the chamber A' through the orifice 20 into the chamber A is under the control of the lower end portion of the metering pin 21 in cooperation with an orifice 31 in a disk-type check valve 32. This check valve 32 cooperates with a seat 33 which surrounds the metering pin 21 below the orifice 20 and closes upwardly and opens downwardly relative to said seat, being constantly urged upwardly toward its normally closed position against said seat by suitable yieldable means 34. Accordingly, said valve is free to open downwardly to permit free by-pass of liquid from the chamber A into the chamber A' so that such by-pass of the liquid is solely under the control of the upper portion of the metering pin 21 in cooperation with the orifice 20. On the other hand, since said valve closes immediately the pressure in the chamber A' becomes predominant, it is manifest that return flow of liquid from the chamber A' into the chamber A is under the control of the lower end portion of the metering pin 21 in cooperation with the orifice 31 in said valve.

As in the case of the upper end portion of the metering pin 21 which cooperates with the orifice 20, the lower end portion of said metering pin which cooperates with the orifice 31 is of different cross sectional areas at different points along its length to afford an effective cross sectional area of the orifice 31 such as is calculated to permit just the right amount of by-pass of liquid from the chamber A' into the chamber A to properly check outward movements of the cylinder 10 and the piston 11 relative to each other consistent with the recoil energy of the shock absorber to be dissipated. Thus, outward movements of the cylinder 10 and the piston 11 relative to each other during recoil actions of the shock absorber are smoothly checked in the same manner as inward movements thereof are smoothly checked during imposition of impact loads upon the shock absorber.

Moreover, it is pointed out in this connection that the metering pin 21 maintains its control of the effective areas of the orifices 20 and 31 throughout the full range of stroke movements of the shock absorber so that the latter is equally efficient in all stroke positions thereof to smoothly check or absorb the energy of impact and recoil loads to which it may be subjected within, of course, its capacity to resist such loads.

In the case of a crash landing of the aircraft, the pressure generated in the chamber A may become so high as to result in choking of the orifice 20 by the liquid. In that event, the pressure of the liquid in the chamber A' would not immediately rise sufficiently to raise the metering pin the required amount to effect the required increase in the effective area of the orifice 20 to relieve the pressure in the chamber A within the brief period of time required to prevent the shock absorber from acting in the nature of a solid strut. However, if the orifice 20 should become choked with liquid, the plunger 27 obviously will be subjected to the same high pressure of the liquid as prevails in the chamber A, with the result that said plunger will instantaneously be raised until there is brought into the plane of the orifice 20 a portion of the metering pin of the required small diameter to afford the necessary increase in the effective area of said orifice to permit the required amount of liquid to flow therethrough from the chamber A into the chamber A' to relieve the excessively high pressure in the chamber A. Any danger of the shock absorber acting as a solid strut thereby is avoided and as soon as the excessively high pressure of the liquid in the chamber A has been relieved the metering pin assumes a position as determined by the stroke position of the shock absorber and the corresponding normal pressure of the liquid in the chamber A' properly to regulate flow of the liquid between the chambers A and A'.

Summarizing, the present shock absorber is designed to absorb, uniformly throughout its stroke and at every point in its stroke consistent with the dynamic energy to be dissipated, normal impact loads imposed thereon; to correspondingly absorb recoil forces imposed thereon; to provide a soft, flexible taxiing condition for an airplane upon which it may be used, and to avoid any hydrostatic locks such as might cause it to act in the nature of a solid strut.

Referring now to the alternative embodiments of the invention illustrated in Figs. 4 to 7 of the drawings, wherein the same reference characters as are employed in Figs. 1 to 3 are used to designate corresponding parts, and with particular reference first to the embodiment of the invention illustrated in Fig. 4, it will be observed that the cylinder 10 is disposed uppermost and that the piston 11 is disposed lowermost as in the Figs. 1 to 3 embodiment of the invention; that in the cylinder 10 is a fixed bulkhead 35 which divides the same into a lower, liquid-filled chamber A and an upper chamber B which contains compressed air; and that a metering pin valve 18, which may be presumed to be a duplicate of the metering pin valve illustrated in Figs. 1 to 3, is associated with the bulkhead 35 in the same manner as the metering pin valve of the Figs. 1 to 3 embodiment of the invention is associated with the piston head 16. Accordingly, as the cylinder 10 and the piston 11 move inwardly relative to each other under impact loads imposed upon the shock absorber, liquid will flow from the chamber A through the valve 18 into the chamber B and the pressure of the air in the chamber B thereby will be increased with the result that the metering pin of said valve 18 will be positioned to regulate the flow of the liquid at a rate consistent with the dynamic energy to be absorbed. In other respects, too, the valve 18 will function in the same manner as the valve shown in Figs. 1 to 3. Accordingly, the shock absorber of Fig. 4 obviously will function in the same general manner as the shock absorber of Figs. 1 to 3.

Referring particularly to the embodiment of the invention illustrated in Fig. 5 of the drawings, it will be observed that the shock absorber is, in all essential respects, a duplicate of the shock absorber illustrated in Figs. 1 to 3 and is employed as a part of an airplane landing gear of the lever suspension type, being interposed between an arm 36 fixed to and depending from the fuselage 12 of the airplane and the lower, wheel-carrying end of a second arm 37 which is pivoted at its upper end to the lower end of the arm 36 as indicated at 38.

As distinguished from the construction shown in Figs. 1 to 3, the shock absorber of the Fig. 5 embodiment of the invention is characterized by having the metering pin valve 18 thereof disposed horizontally instead of vertically to permit a longer stroke of the shock absorber, in consideration of the limitation to its over-all length, than would be possible if said valve were disposed vertically. Because of the valve 18 being disposed horizontally, a hood 39 is employed to isolate the metering pin of said valve from the liquid chamber A and an opening 40 is provided in the head 16 of the piston 11 so that said metering pin is subjected to the pressure of the liquid in the chamber A. In other respects the Fig. 5 embodiment of the invention is the same constructionally as the Figs. 1 to 3 embodiment of the invention and its mode of operation is identical with the Figs. 1 to 3 embodiment of the invention.

Fig. 6 illustrates a construction which is the same as the Fig. 5 construction, except that the valve 18 is disposed within the chamber A' and a jacket 41 is employed to isolate the openings 19 of the valve casing from said chamber A', an opening 42 in the piston head 16 providing communication between the chamber A and said jacket 41. Thus, the mode of operation of the Fig. 6 embodiment of the invention is identical with the mode of operation of the other embodiments of the invention.

Fig. 7 illustrates an embodiment of the invention in which the cylinder 10 is disposed lowermost, the piston 11 is disposed uppermost and the valve 18 is mounted upon the piston head 16 at the upper side thereof. According to this embodiment of the invention the cylinder 10 below the piston head 16 constitutes the liquid chamber A of the shock absorber and the piston space above said piston 16 constitutes the air chamber B of the shock absorber. A jacket 43 isolates the openings 19 in the valve casing from the air chamber B and an opening 44 in the head 16 provides communication between said jacket and the liquid chamber A. Thus, the mode of operation of this form of the invention also is identical with the mode of operation of the other forms of the invention.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A shock absorber comprising a pair of members movable relative to each other by imposition upon the shock absorber of a force to be resisted, said shock absorber including a liquid containing chamber, a combined liquid-receiving and compressed-air-containing chamber and a wall between said chambers having an orifice for outlet of liquid from said liquid-containing chamber to said combined chamber, said members being effective when moved relative to each other by imposition upon the shock absorber of a force to be resisted to subject the liquid in said liquid-containing chamber to pressure and to force it therefrom through said orifice into said combined chamber thereby to compress the air in the latter, a metering pin of different cross sectional areas at different points along its length disposed in said orifice for longitudinal movement with respect thereto to vary the effective area thereof, yieldable means tending constantly to move said metering pin outwardly relative to said liquid-containing chamber, a cylinder containing air at substantially atmospheric pressure, said metering pin being exposed to the pressure of the liquid and the air in said combined chamber and including a plunger fixed with respect thereto and disposed in said cylinder whereby it is movable inwardly relative to said liquid-containing chamber by the pressure of the liquid and the compressed air in said combined chamber, thus to assume positions affording different predetermined effective orifice areas for different relative positions of said members and the corresponding liquid and air pressures as long as said orifice does not become choked with liquid and quickly to assume a position affording a large effective orifice area for relief of the liquid pressure in the event of a sudden increase of the liquid pressure so great as to cause choking of said orifice.

2. A shock absorber as set forth in claim 1 including a check valve which does not interfere with flow of liquid from the liquid-containing chamber through the orifice but which obstructs return flow of the liquid through said orifice, the metering pin having a portion cooperating with said check valve to regulate return flow of the liquid through said orifice to said liquid-containing chamber during recoil action of the shock absorber.

3. A shock absorber as set forth in claim 1 in which the cylinder and the plunger and the orifice are of equal cross sectional areas and the metering pin is of lesser cross sectional area.

4. A shock absorber comprising a cylinder and a hollow piston slidable therein, said cylinder and said piston being closed at their outer ends and said piston including a head closing its inner end, the cylinder space between said piston head and the outer end of said cylinder constituting a liquid-containing chamber, a floating piston in said hollow piston, the space between said floating piston and the outer end of said hollow piston constituting a compressed-air-containing chamber, the space between said floating piston and the head of said hollow piston constituting a chamber to receive liquid forced from said liquid-containing chamber, a valve carried by said piston head and having an orifice for flow of liquid between said liquid-containing chamber and said liquid receiving chamber, a metering pin of different cross sectional areas at different points along its length disposed in said orifice for longitudinal movement with respect thereto to vary the effective area thereof, yieldable means tending constantly to move said metering pin toward said liquid-receiving chamber, means exposing the end of said metering pin nearer said liquid-containing chamber to atmospheric pressure, said metering pin being exposed intermediate its ends to the pressure of the liquid in said liquid-containing chamber and at its other end to the pressure of the liquid in said liquid-receiving chamber whereby it is movable in the opposite direction by the pressure of the liquid in said liquid-containing chamber and the pressure of the air in said compressed-air-containing chamber acting through the floating piston and the liquid in said liquid-receiving chamber, thus to assume positions affording different predetermined effective areas of said orifice for different stroke positions of said cylinder and said hollow piston and the corresponding liquid and air pressures as long as said orifice does not become chocked with liquid and quickly to assume a position affording a large effective orifice area for relief flow of liquid from said liquid-containing chamber to said liquid-receiving chamber in the event of a sudden increase in the pressure of the liquid in said liquid-containing chamber so great as to cause choking of said orifice.

5. A shock absorber comprising a cylinder and a piston slidable therein, said cylinder being closed at its outer end and having therein a bulkhead, the space between said piston and said bulkhead constituting a liquid-containing chamber, the space between the outer end of said cylinder and said bulkhead constituting a combined compressed-air-containing chamber and a chamber to receive liquid forced from said liquid-containing chamber, a valve carried by said bulkhead and having an orifice for flow of liquid between said chambers, a metering pin of different cross sectional areas at different points along its length disposed in said orifice for longitudinal movement with respect thereto to vary the effective area thereof, yieldable means tending constantly to urge said metering pin toward said combined chamber, means exposing the end of said metering pin nearer said liquid-containing chamber to atmospheric pressure, said metering pin being exposed intermediate its ends to the pressure of the liquid in said liquid-containing chamber and at its other end to the pressure in said combined chamber whereby it is movable in the opposite direction by the pressure of the liquid in said liquid containing chamber and the pressure of the air in said combined chamber, thus to assume different positions affording different predetermined effective areas of said orifice for different stroke positions of said cylinder and piston and the corresponding liquid and air pressures as long as said orifice does not become chocked with liquid and quickly to assume a position affording a large effective orifice area for relief flow of liquid from said liquid-containing chamber to said combined chamber in the event of a sudden increase in the pressure of the liquid in said liquid-containing chamber so great as to cause choking of said orifice.

NEVIN S. FOCHT.